(12) United States Patent
Ding et al.

(10) Patent No.: US 12,348,149 B2
(45) Date of Patent: Jul. 1, 2025

(54) SYNCHRONOUS RECTIFICATION TO IMPROVE EFFICIENCY OF ELECTRICITY CONVERSION FOR HARVESTING ENERGY FROM LOW VOLTAGE SOURCES

(71) Applicant: National Research Council of Canada, Ottawa (CA)

(72) Inventors: Heping Ding, Ottawa (CA); Ryan Griffin, Ottawa (CA)

(73) Assignee: National Research Council of Canada, Ottawa (CA)

( * ) Notice: Subject to any disclaimer, the term of this patent is extended or adjusted under 35 U.S.C. 154(b) by 25 days.

(21) Appl. No.: 18/010,745

(22) PCT Filed: Jun. 16, 2021

(86) PCT No.: PCT/CA2021/050821
§ 371 (c)(1),
(2) Date: Dec. 15, 2022

(87) PCT Pub. No.: WO2021/253122
PCT Pub. Date: Dec. 23, 2021

(65) Prior Publication Data
US 2023/0344360 A1    Oct. 26, 2023

Related U.S. Application Data

(60) Provisional application No. 63/039,835, filed on Jun. 16, 2020.

(51) Int. Cl.
*H02M 3/335* (2006.01)
(52) U.S. Cl.
CPC ............................. *H02M 3/33592* (2013.01)

(58) Field of Classification Search
CPC .......................... H02M 3/33592; Y02B 70/10
See application file for complete search history.

(56) References Cited

U.S. PATENT DOCUMENTS 4,870,555 A    9/1989  White
5,726,869 A    3/1998  Yamashita et al.
(Continued)

FOREIGN PATENT DOCUMENTS

CN    206060542 U   *  3/2017
CN    107332341 A   *  11/2017
(Continued)

OTHER PUBLICATIONS

International Search Report issued in International Application No. PCT/CA2021/050821, Aug. 23, 2021, 3 pages.
(Continued)

*Primary Examiner* — Sisay G Tiku
(74) *Attorney, Agent, or Firm* — Aird & McBurney LP

(57) ABSTRACT

A DC-DC converter for converting a low voltage DC input to a higher voltage DC output, the DC-DC converter comprising: an oscillator comprising a first relatively voltage sensitive and relatively low power transistor and a second relatively voltage insensitive and relatively high power transistor, the oscillator producing an AC signal from the low voltage DC input; a first transformer for converting the AC signal produced by the oscillator to a higher voltage AC signal; an autonomous, synchronous voltage-doubling rectification circuit for converting the higher voltage AC signal to the higher voltage DC output, wherein the autonomous, synchronous voltage-doubling rectification circuit comprises a second transformer, a first shunt switch and a second shunt switch; and wherein current through the second transformer controls the synchronous rectification.

19 Claims, 3 Drawing Sheets

(56) References Cited

U.S. PATENT DOCUMENTS

| | | | |
|---|---|---|---|
| 6,091,234 | A | 7/2000 | Kitagawa |
| 6,295,213 | B1 * | 9/2001 | Smith ............... H02M 3/33569 |
| | | | 363/21.01 |
| 6,618,274 | B2 | 9/2003 | Boylan et al. |
| 7,746,042 | B2 | 6/2010 | Williams et al. |
| 7,791,903 | B2 | 9/2010 | Zhang et al. |
| 8,138,735 | B2 * | 3/2012 | Ivanov ................. H02M 3/156 |
| | | | 323/284 |
| 9,444,354 | B2 * | 9/2016 | Woias ..................... H02M 1/36 |
| 10,044,218 | B2 * | 8/2018 | Tiefnig ...................... H02J 7/35 |
| 11,342,854 | B1 * | 5/2022 | Urciuoli ............. H02M 3/3381 |
| 2005/0041437 | A1 * | 2/2005 | Chian ................. H02M 3/3381 |
| | | | 363/16 |
| 2007/0210774 | A1 | 9/2007 | Kimura et al. |
| 2008/0123374 | A1 * | 5/2008 | Vinciarelli .............. H02M 7/10 |
| | | | 363/65 |
| 2010/0195360 | A1 | 8/2010 | Salerno et al. |
| 2010/0208498 | A1 * | 8/2010 | Rubio ................. H02M 3/1563 |
| | | | 363/18 |
| 2013/0265023 | A1 | 10/2013 | Schwartz |
| 2013/0324059 | A1 | 12/2013 | Lee et al. |
| 2016/0099660 | A1 | 4/2016 | Khaligh et al. |
| 2017/0012193 | A1 | 1/2017 | Jogia |
| 2017/0133938 | A1 | 5/2017 | Tiefnig |
| 2020/0091825 | A1 * | 3/2020 | Ding ........................ H02M 1/36 |
| 2022/0385198 | A1 * | 12/2022 | Lou ................... H02M 3/33571 |

FOREIGN PATENT DOCUMENTS

| | | | | |
|---|---|---|---|---|
| CN | 206759768 | U | * | 12/2017 |
| EP | 2225824 | B1 | * | 7/2016 .............. H02M 1/36 |

OTHER PUBLICATIONS

Written Opinion of the International Searching Authority issued in International Application No. PCT/CA2021/050821, Aug. 23, 2021, 4 pages.

Grgić, D., et al. "Ultra-low input voltage DC-DC converter for micro energy harvesting." Proc. Power MEMS. (2009): 265-268.

Zhong, W. X., et al. "Using self-driven AC-DC synchronous rectifier as a direct replacement for traditional power diode rectifier." IEEE Transactions on Industrial Electronics 59.1 (2011): 392-401.

Qian, T., et al. "Self-driven synchronous rectification scheme without undesired gate-voltage discharge for DC-DC converters with symmetrically driven transformers." IEEE Transactions on Power Electronics 23.1 (2008): 506-510.

* cited by examiner

700

SYNCHRONOUS RECTIFICATION TO IMPROVE EFFICIENCY OF ELECTRICITY CONVERSION FOR HARVESTING ENERGY FROM LOW VOLTAGE SOURCES

FIELD

Aspects of this disclosure relate to methods and systems for converting energy harvested from low voltage sources.

BACKGROUND

Many sources of energy that can be harvested are in the form of electricity or can be readily converted to it. However, in many practical situations, these electricity sources are either weak, with too high or too low a voltage, or have other issues. Consequently, these sources are rarely directly useful to low power electronic devices, for example in wireless sensor networks and Internet of Things (IoT) applications, where a relatively steady supply of a direct current (DC) voltage of a few volts may be required.

It would be advantageous to have systems and methods for efficiently and robustly converting low voltage DC electricity, such as from a thermo-electric generator (TEG), for example a thermopile, into a usable form, for example for use by wireless sensor networks and IoT applications.

Some systems employ a step-up DC-DC converter to turns low voltage DC electricity from a TEG into a usable form by converting a low voltage DC input to a higher voltage DC output. There are various step-up DC-DC converters for TEG energy harvesting available on the market, and many of these schemes rely on an oscillator to perform' the conversion. Examples include those proposed in the following three references:

(a) EnOcean GmbH, ECT 310 Perpetuum, https://www.enocean.com/en/enocean_modules/ect-310-perpetuum/.
(b) Linear Technology Corporation, LTC3108—Ultralow Voltage Step-Up Converter and Power Manager, http://www.linear.com/product/LTC3108.
(c) Dario Grgić, Tolgay Ungan, Miloš Kostić, and Leonhard M. Reindl, "Ultra-Low Input Voltage DC-DC Converter for Micro Energy Harvesting," PowerMEMS 2009, pp. 265268, Washington DC, USA, Dec. 1-4, 2009.

Each of the three schemes introduced above work in a certain input range and at a relatively low efficiency. Their turn-on source conditions and efficiencies are summarized in Table 1 below, where VOC is the open-circuit voltage of the TEG device and RTEG is the internal resistance (also known as the source resistance) of the device. The turn-on source conditions for this example include turn-on voltage and RTEG. The turn-on voltage is the minimum voltage required from the source before the DC-DC converter starts to produce a DC output voltage with an absolute value greater than that of the input.

Table 1 shows the turn-on source conditions and efficiencies of existing schemes:

TABLE 1

Turn-on source conditions and efficiencies of existing schemes

|  | ECT310 by EnOcean | LTC3108 by Linear Technology | Dario Grgić et al. |
|---|---|---|---|
| Turn-on source condition | VOC = 20 mV & RTEG = 2 Ω or VOC = 50 mV & RTEG = 50 Ω | VOC = 50 mV & RTEG = 20 Ω or VOC = 100 mV & RTEG = 50 Ω | VOC = 10 mV & RTEG = 50 Ω[1] |
| Efficiency | 30% | 20-40% | <18% |

Note that, for above-noted scheme (c) described by Dario Grgić et al., VOC at RTEG = 50 Ω is derived from information provided in the abstract of the third reference: Vcc = 6 mV (closed-circuit input voltage) and input power of 490 nW.

FIG. 1 shows prior art step-up DC-DC converter 110, as described in the applicant's co-pending application U.S. application Ser. No. 16/131,650, the entire contents of which are incorporated herein by reference. Step-up DC-DC converter 110 comprises a lower turn-on voltage and has been shown to possess an efficiency of at least 45%. While this efficiency is impressive, even higher efficiencies in energy harvesting are desirable. In a typical application, low-voltage DC electricity is converted from a thermo-electric generator (TEG) into another DC potential of a few volts to drive low-power electronic devices such as those in wireless sensor networks and Internet of Things (IoT). Accordingly, any improvement in efficiency enables a step-up DC-DC converter to better utilize the very limited energy available and provide more power to the load.

Several approaches have been proposed to further boost to the efficiency of the above-noted prior art step-up DC-DC converter 110. For example, some approaches employ synchronous rectification, such as, the LM5122 Wide-Input Synchronous Boost Controller, manufactured by Texas Instruments, U.S.A. and the UCC24630 synchronous rectifier controller, manufactured by Texas Instruments, U.S.A., in an attempt to precisely control the timing for the switches. Unfortunately, such sophisticated controllers consume significant overhead power, which is undesirable in TEG energy harvesting applications. There also exist "self-driven" synchronous rectification schemes which do not need an explicit controller, and hence save the overhead power, however, these schemes are driven by the voltages applied to the MOSFET switches, and cannot guarantee an appropriate timing, which is essential for assuring a high efficiency.

Given the difficulties discussed above, especially the need to dedicate any overhead power on switch control, synchronous rectification has not been adopted extensively in the realm of DC-DC step-up conversion for energy harvesting.

SUMMARY

In one aspect of the disclosure, there is provided a DC-DC converter for converting a low voltage DC input to a higher voltage DC output, the DC-DC converter comprising:
  an oscillator comprising a first relatively voltage sensitive and relatively low power transistor and a second relatively voltage insensitive and relatively high power transistor, the oscillator producing an AC signal from the low voltage DC input;
  a first transformer for converting the AC signal produced by the oscillator to a higher voltage AC signal;

an autonomous, synchronous voltage-doubling rectification circuit for converting the higher voltage AC signal to the higher voltage DC output, the autonomous, synchronous voltage-doubling rectification circuit comprising a second transformer, a first shunt switch and a second shunt switch; and wherein current through the second transformer controls the synchronous rectification.

In one aspect of the disclosure, there is provided a DC-DC converter for converting a low voltage DC input to a higher voltage DC output, the DC-DC converter comprising:

an oscillator comprising a first relatively voltage sensitive and relatively low power transistor and a second relatively voltage insensitive and relatively high-power transistor, the oscillator producing an AC signal from the low voltage DC input;

a first transformer for converting the AC signal produced by the oscillator to a higher voltage AC signal;

an autonomous, synchronous voltage-doubling rectification circuit for converting the higher voltage AC signal to the higher voltage DC output, wherein the autonomous, synchronous voltage-doubling rectification circuit comprises a second transformer, a first shunt switch and a second shunt switch; and wherein the first and second transistors of the oscillator are such that the oscillator is initially turned on when the low voltage DC input is sufficiently high to start the oscillator initially using only the first relatively high-sensitivity low power transistor, and the second transistor turns on when the voltage on a secondary side of the transformer exceeds the turn-on voltage of the second transistor.

In another aspect of the disclosure, there is provided a method of converting a low voltage DC input to a higher voltage DC output, the method comprising:

producing an AC signal from the low voltage DC input using an oscillator comprising a first relatively voltage sensitive and relatively low power transistor and a second relatively voltage insensitive and relatively high power transistor, by starting up oscillation of the oscillator when the low voltage DC input is sufficiently high to start the oscillator initially using only the first relatively high-sensitivity low power transistor, and turning on the second transistor when the voltage on a secondary side of the transformer exceeds the turn-on voltage of the second transistor;

converting the AC signal produced by the oscillator to a higher voltage AC signal with a first transformer;

rectifying the higher voltage AC signal to produce the higher voltage DC output using at least a second transformer, a first shunt switch and a second shunt switch forming a rectifier; and using an input current to the rectifier to control the timing of the first shunt switch and the second shunt switch to maximize efficiency.

In another aspect of the disclosure, there is provided an autonomous, synchronous voltage-doubling rectification circuit for converting the higher voltage AC signal to the higher voltage DC output, the synchronous rectification circuit comprising:

a transformer comprising:
 a first shunt switch coupled to the transformer;
 a second shunt switch coupled to the transformer; and
wherein the synchronous rectification is controlled solely by current through the transformer.

In another aspect of the disclosure, there is provided a DC-DC converter with full synchronous rectification scheme that consumes minimal overhead power and comprises switches that are controlled by the current, as opposed to voltage, through the transformer, which results in a robust and simple synchronous rectifier whose timing is appropriate and optimized for maximizing the efficiency, especially in harvesting TEG energy applications.

BRIEF DESCRIPTION OF THE DRAWINGS

Several exemplary embodiments of the present disclosure will now be described, by way of example only, with reference to the appended drawings in which.

DETAILED DESCRIPTION

Figure 1:
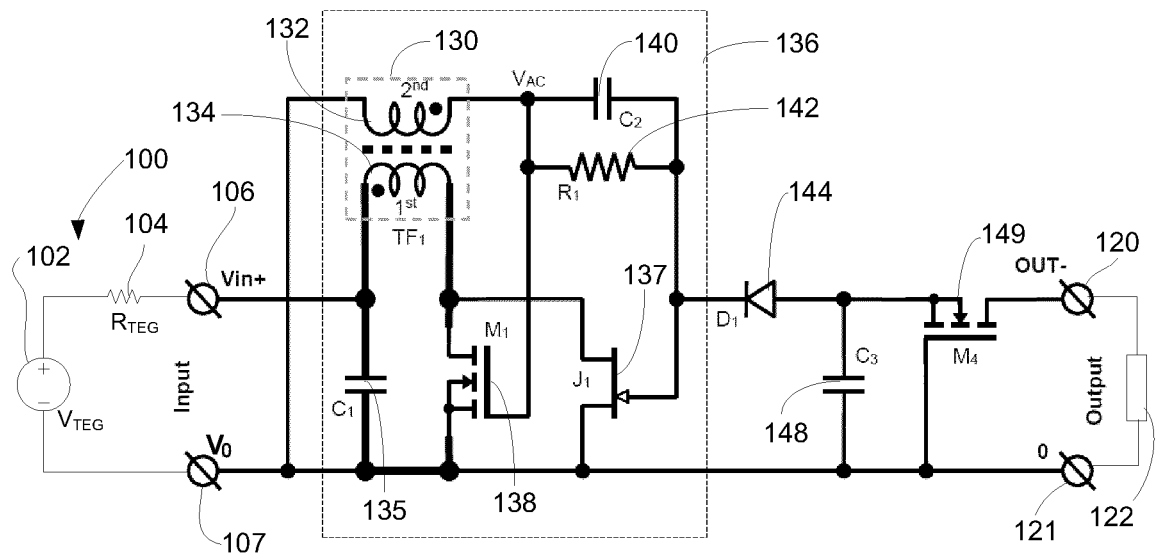
FIG. 1 shows a schematic of a prior art step-up DC-DC converter.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Moreover, it should be appreciated that the particular implementations shown and described herein are illustrative of the invention and are not intended to otherwise limit the scope of the present invention in any way. Indeed, for the sake of brevity, certain sub-components of the individual operating components, and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

Referring to FIG. 1, there is shown a circuit diagram of a power supply and load provided by a step-up converter circuit, generally designated by numeral 100, and as described in the applicant's co-pending application U.S. application Ser. No. 16/131,650, the entire contents of which are incorporated herein by reference. Low voltage source 100 is connected via positive and negative input terminals 106,107 to the provided step-up converter circuit which is generally indicated at 110, which in turn is connected via positive and negative output terminals 120,121 to load 122. Low voltage source 100 and DC-DC converter 110 together form the power supply that powers the load 122. Low voltage source 100 is modelled as a voltage source 102 that produces an input voltage $V_{TEG}$ on input terminal 106 relative to $V_0$ on input terminal 107, and an input resistance $R_{TEG}$ 104.

The schematic of step-up DC-DC converter 110 will be described in detail followed by a description of its functionality. Capacitor $C_1$ 135 is connected across the input terminals 106, 107 to reduce the impact of the fluctuating load current and to suppress potential interference. There is shown transformer 130 having primary winding 134 and secondary winding 132, with the polarity configuration of the transformer windings being indicated by the phasing dots. Primary winding 134 has a predetermined number of turns such that the turns ratio between the primary and the secondary windings 134,132 is known. One terminal of primary winding 134 is connected to input terminal 106 and the other terminal of primary winding 134 is connected to the drains of two transistors of dual-transistor oscillator 136, the two transistors including a low power startup transistor $J_1$ 137, and a higher power transistor $M_1$ 138. One terminal of the secondary winding 132 is connected to $V_0$, and the other is connected to gate of transistor $M_1$ 138 and to gate of transistor $J_1$ 137 via capacitor $C_2$ 140 connected in parallel with resistor $R_1$ 142.

The output of the parallel circuit formed by $C_2$ 140 and $R_1$ 142 is connected to the cathode of a diode $D_1$ 144. The anode of $D_1$ 144 is also connected via a capacitor $C_3$ 148 to $V_0$. The gate of transistor $M_4$ 149 is connected to $V_0$, and drain of transistor $M_4$ 149 is connected to negative output terminal 120. Finally, an optional Zener diode is connected between drain of transistor $M_4$ 149 and $V_0$, equivalently across the output terminals 120,121.

In the embodiment illustrated, the dual-transistor oscillator 136 includes the two transistors $M_1$ 138 and $J_1$ 137, and also the transformer, $C_1$ 135, $C_2$ 140 and $R_1$ 142. However, it should be understood different implementations are possible, so long as the transistor oscillator includes two transistors, one of which has a low turn-on voltage and low power, and the other of which has relatively high turn-on voltage and high power.

An adaptive clamping mechanism is provided to ensure a suitable bias for the start-up transistor $J_1$ 137 under practical source and load conditions. It is beneficial to bias $J_1$ 137 so that it operates around the vicinity of its VGS(off), for example of around −0.8 V for transistor 2SK932 as $J_1$ 137. VGS(off) of a JFET such as $J_1$ 137 is the VGS at which the transistor is said to be cutoff, and its VGS should not go positive normally.

In the described embodiment, an adaptive clamping mechanism consisting of $C_2$ 140 and the Gate-Source PN junction of $J_1$ 137 keeps $J_1$ 137 suitably biased all the time. The voltage across $C_2$ 140 follows the peak positive voltage of the transformer's secondary side and equals the latter minus the forward voltage drop of $J_1$ 137's Gate-Source PN junction. When the AC voltage of transformer's secondary side increases for whatever reason, $C_2$ 140 is charged to a higher voltage through the Gate-Source PN junction of $J_1$ 137. This keeps the PN junction reverse biased most of the time. On the other hand, if the AC voltage of the transformer's secondary side decreases, $C_2$ 140 is not charged because the PN junction of $J_1$ 137 stays reverse biased. Then, $C_2$ 140 discharges through $D_1$ 144 to the load and to a less extent through $R_1$ 142, until the voltage across $C_2$ 140 is low enough so that the aforementioned charging process resumes.

Example component values and types are indicated in FIG. 1. It should be clearly understood that these are for the purpose of example only. The provided circuit is suitable to transform voltages from a TEG source, typically in the 10 to 20 mV range, to a higher voltage suitable for portable electronics, for example 2-5 V. Exemplary component values and types are:

$C_1$ 47 μF; for example, ceramic, thin film, polyester, or electrolytic.

Transformer 130 may include primary windings and secondary windings with various turns ratios. In one exemplary implementation, transformer 130 has characteristics similar to that of Coilcraft's LPR6235-253PMR, LPR6235-123QMR or LPR6235-752SMR;

$M_1$: NTUD 3170NZ;
$J_1$: BF862 or 2SK932;
$C_2$:4.7 nF, for example ceramic;
$R_1$:100 MΩ;
$D_1$:1N649-1 or similar. In another specific example, the gate source junction of another JFET such as 2SK932 is used for $D_1$;
$C_3$:4.7 nF ceramic;
$M_2$: NTUD 3170NZ; and
D2: ESD9R3.3S, or other suitable diode.

Accordingly, prior art step-up DC-DC converter 110 has a lower turn-on voltage and a higher efficiency than the existing schemes, in the above-noted references: EnOcean GmbH, ECT 310 Perpetuum; Linear Technology Corporation, LTC3108—Ultralow Voltage Step-Up Converter and Power Manager; and "Ultra-Low Input Voltage DC-DC Converter for Micro Energy Harvesting.

Figure 2:
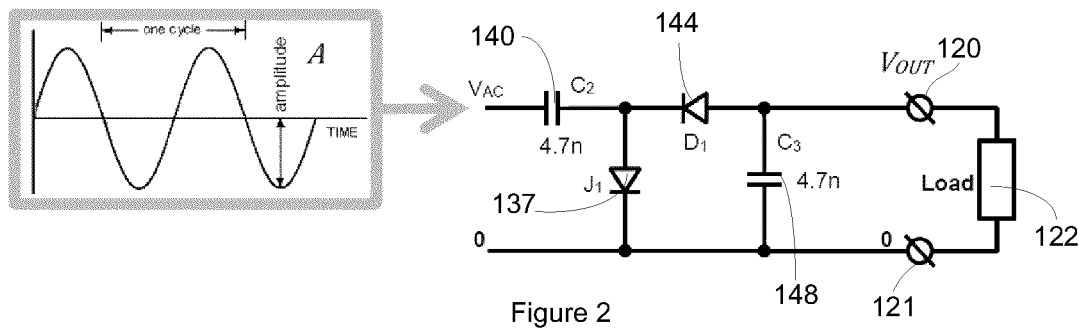
FIG. 2 shows a rectification portion extracted from the prior art step-up DC-DC converter of FIG. 1.

For easy understanding, the rectification part in FIG. 1 is extracted and equivalent circuitry depicted in FIG. 2. As can be seen, this circuitry 200 represents a voltage-doubling rectification scheme. The output voltage can be expressed as $$V_{OUT} = 2(A - V_{FD}) \qquad \text{Eq. (1)}$$

where A is the amplitude of the input voltage $V_{AC}$ and $V_{FD}$ is the forward voltage drop the diode $D_1$ 144 and JFET device $J_1$ 137, typically in the range of 300-700 mV. It can be seen that the presence of $V_{FD}$ reduces the output magnitude by 600-1400 mV. Generally, the efficiency of converter 110 suffers significantly if $A \gg V_{FD}$ does not hold. Given that A is in the range between 1 V and 4 V, then the efficiency of converter 110 is severely impacted.

Figure 3:
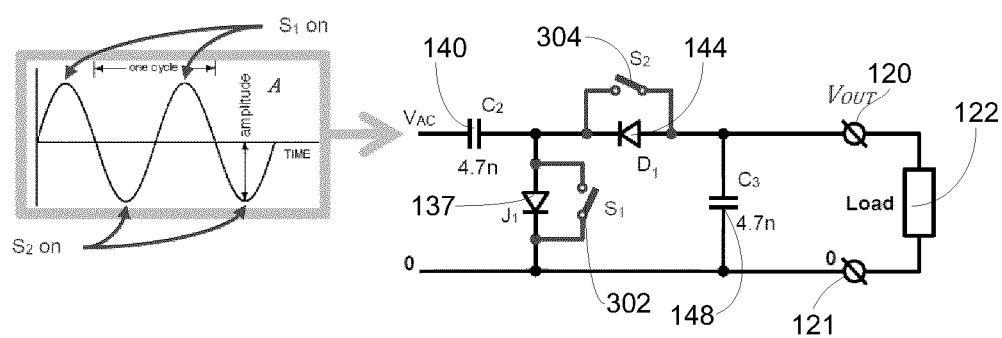
FIG. 3 shows a simplified schematic of a synchronous (active) rectification circuit of the prior art step-up DC-DC converter of FIG. 1.

The impact of $V_{FD}$ may be potentially eliminated by synchronous rectification or active rectification, as shown in FIG. 3, in which switch $S_1$ 302 shorts $J_1$ 137 which acts as a regular diode, and $S_2$ 304 shorts diode $D_1$ 144, at times required to eliminate the impact of $V_{FD}$. In particular, switch $S_1$ 302 (or $S_2$ 304) turns on when and only when $J_1$ 137 (or $D_1$ 144) should otherwise be conducting. Ignoring the reverse leakage, a regular diode in combination with such a switch is referred to as an "ideal diode"—equivalently with null $V_{FD}$. If the timings for $S_1$ 302 and $S_2$ 304, implemented by MOSFETS, are properly controlled, the output voltage will be $$V_{OUT} = 2A \qquad \text{Eq. (2)}$$

which is a great improvement over Eq. (1) when A is small.

The challenges in implementing the synchronous rectification in FIG. 3 for the low-power energy harvesting applications are that the available overhead power for controlling is next to none; without a sophisticated, and power hungry, controller, it is difficult to appropriately control the timing for the switches.

Figure 4:
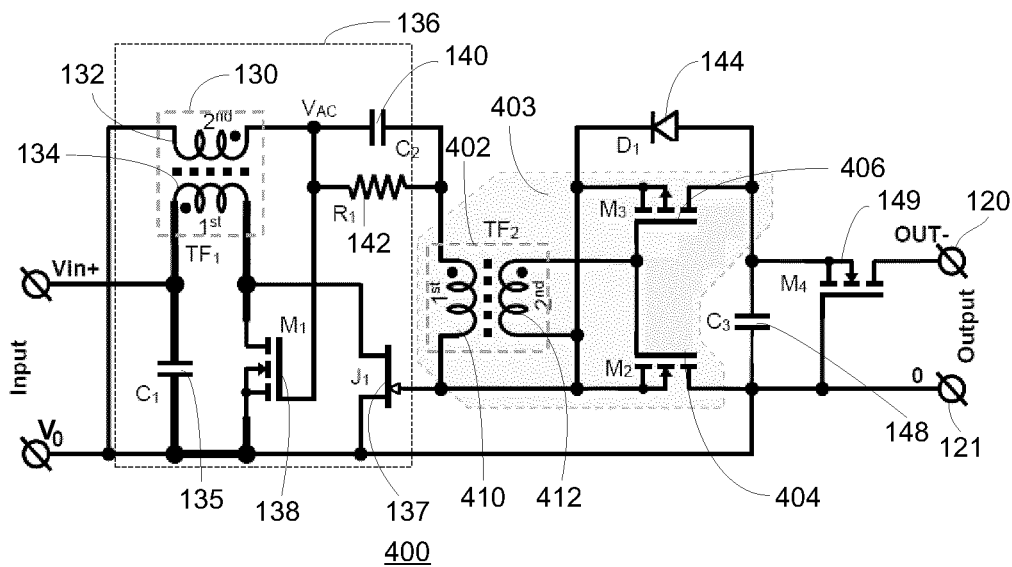
FIG. 4 shows a DC-DC step-up converter featuring synchronous rectification with synchronous rectification control transformer $TF_2$.

Now referring to FIG. 4, there is shown DC-DC step-up converter 400 featuring synchronous rectification with synchronous rectification control transformer $TF_2$ 402 in one exemplary implementation. As can be seen, DC-DC step-up converter 400 augments circuitry 100 shown in FIG. 1 by adding synchronous voltage-doubling rectifier 403, indicated by the shaded area, comprising transformer $TF_2$ 402, shunt switches $M_2$ 404 and $M_3$ 406.

Similarly, as in FIG. 3, $J_1$ 137 and $D_1$ 144 act as regular diodes in FIG. 4. In addition, $J_1$ 137 and $D_1$ 144 are accompanied by shunt switches $M_2$ 404 and $M_3$ 406, respectively. Accordingly, $M_2$ 404 and $M_3$ 406 act as $S_1$ 302 and $S_2$ 304, respectively, in FIG. 3. Further, $M_2$ 404 and $M_3$ 406 are controlled by the current through $C_2$ 140, that is, the input current to the voltage-doubling rectifier. It should be noted that the current through $R_1$ 142 is negligibly small.

In order to highlight the novel features of DC-DC step-up converter 400 of FIG. 4, DC-DC step-up converter 110 of FIG. 1 is compared to DC-DC step-up converter 400 in two scenarios, for the input voltage $V_{AC}$ being positive and negative, respectively.

In a first instance, in which $V_{AC}$ is positive, when the rectifier's input voltage $V_{AC}$ is positive and approaching its maximum (also see FIG. 3), capacitor $C_2$ 140 is charging with a current going from the left to the right and also through the G-S PN junction of $J_1$ 137 and in the case of FIG. 4 also through primary winding 410 of the transformer $TF_2$ 402.

With FIG. 1, this current causes a voltage drop of $V_{FD}$ over the G-S junction of $J_1$ 137, so that the voltage across $C_2$ 140 can reach $(A-V_{FD})$ at most, as indicated by Eq. (1).

With FIG. 4, $C_2$ 140's charging current also goes through primary winding 410 of $TF_2$ 402, resulting in a compliance voltage across it (polarity dot being positive). Having been observed to be very small, of about 10-20 mV, the compliance voltage induces a voltage at secondary winding 412 of $TF_2$ 402 (polarity dot being positive) 100 times larger, since the turns ratio of $TF_2$ 402 is 1:100. When the induced voltage becomes positive enough to overcome the G-S threshold voltage of $M_2$ 404 (N-channel MOSFET), it turns on $M_2$ 404 which shorts the G-S junction of $J_1$ 137, thereby forming an ideal diode. Following its peak, $V_{AC}$ decreases so that the charging current for $C_2$ 140 vanishes, so does the induced voltage at the secondary winding 132 of $TF_2$ 402. This turns $M_2$ 404 off to prevent unwanted current if any through it.

In a second instance when $V_{AC}$ being negative, and approaching its minimum (the negative peak), $C_2$ 140 is discharging with a current going from the right to the left and also through $D_1$ 144 and in the case of FIG. 4 also through the primary winding 134 of the transformer $TF_2$ 402.

In FIG. 1, this current causes a voltage drop of $V_{FD}$ across $D_1$ 144, so that the magnitude of the output voltage is $V_{FD}$ lower than that without the voltage drop. However, in FIG. 4, the compliance voltage across primary winding 410 of $TF_2$ 402 produces an induced voltage at secondary winding 410 of $TF_2$ 402 (polarity being dot negative). Given $TF_2$ 402's turns ratio is 1:100, this induced voltage is 100 times larger than the compliance voltage at primary winding 410. When the induced voltage becomes negative enough to overcome the G-S threshold voltage of $M_3$ 406 (P-channel MOSFET), it turns on $M_3$ 406 which shorts $D_1$ 144, thereby forming an ideal diode. Following the negative peak, $V_{AC}$ rises so that the charging current for $C_2$ 140 vanishes, so does the induced voltage at secondary winding 412 of $TF_2$ 402. This turns $M_3$ 406 off to prevent unwanted current, if any, through it. The voltage drop of $V_{FD}$ over $D_1$ 144 during the charging of $C_1$ 135 is eliminated.

Ordinarily, $D_1$ 144 may not be necessary since $M_3$ 406 already has a built-in diode in parallel with $D_1$ 144. In certain circumstances, $M_2$ 404 and $M_3$ 406 can not be guaranteed to operate as ideal diodes all the time, should $M_3$ 406 fail to be ideal, then $D_1$ 144 offers a smaller forward voltage drop than $M_3$ 406's protection diode. Correspondingly, the fall-back for $M_2$ 404 is $J_1$ 137's G-S junction. Similarly, as disclosed in U.S. application Ser. No. 16/131,650, $D_1$ 144 can be replaced by an inexpensive alternative that is appropriately chosen, for example, the G-S junction of a JFET device 2SK932 (same as $J_1$ 137).

Accordingly, the synchronous rectification scheme of FIG. 4 eliminates the voltage drop $V_{FD}$ of both $J_1$ 137 and $D_1$ 144 during a full rectification cycle. In addition, the shorting switches $M_2$ 404 and $M_3$ 406 are controlled by the current through the voltage-doubling synchronous rectification circuit. It is further contemplated that transformer $TF_2$ 402 can in turn provide suitable driving voltages for these two shorting switches $M_2$ 404 and $M_3$ 406. In one implementation $D_1$ 144 is replaced with one of the diode junctions of $J_1$ 137.

Depending on the application, a single-transformer configuration for $TF_2$ 402 shown in FIG. 4 may not be optimized for a wide range of source and load conditions.

Figure 5:
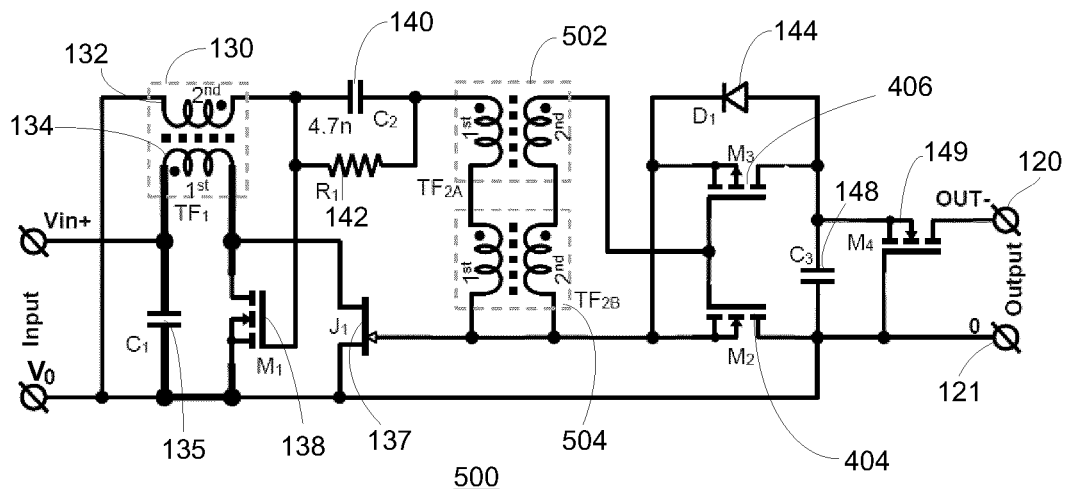
FIG. 5 shows a DC-DC step-up converter featuring synchronous rectification with synchronous rectification control transformer $TF_2$ split into two transformers with a series primary connection, in one implementation.
Figure 6:
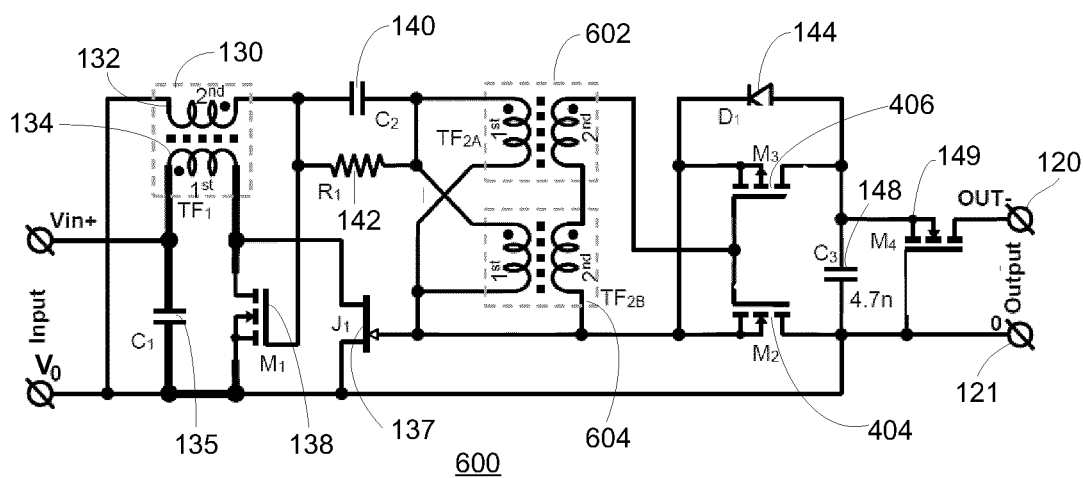
FIG. 6 shows a DC-DC step-up converter featuring synchronous rectification with synchronous rectification control transformer $TF_2$ split into two transformers with a parallel primary connection, in one implementation.

In another exemplary implementation, there is provided a DC-DC step-up converter 500 featuring synchronous rectification with synchronous rectification control transformer $TF_2$ 402 split into transformers $TF_{2A}$ 502 and $TF_{2B}$ 504 and a series primary connection, as shown in FIG. 5. In FIG. 6, there is provided a DC-DC step-up converter 600 featuring synchronous rectification with synchronous rectification control transformer $TF_2$ 402 split into transformers $TF_{2A}$ 602 and $TF_{2B}$ 604 and a parallel primary connection, in another exemplary implementation.

Since the secondary windings of $TF_{2A}$ 502 and $TF_{2B}$ 504 are connected in series, these configurations can potentially provide higher driving voltages for $M_2$ 404 and $M_3$ 406. This may improve the efficiency further. As examples, typical choices for transformers in FIGS. 4, 5 and 6 are summarized in the following table:

TABLE 2

| Transformer | | Turns ratio | Winding | L(H) | R(Ω) |
| --- | --- | --- | --- | --- | --- |
| $TF_1$ | Coilcraft LPR235 | 752 SMR | 1:100 | $1^{st}$ | 7.5μ | 85 m |
| | | | | $2^{nd}$ | — | 340 |
| $TF_2$ | | 123 SMR | 1:50 | $1^{st}$ | 12.5μ | 85 m |
| | | | | $2^{nd}$ | — | 200 |
| | | 253 SMR | 1:20 | $1^{st}$ | 25μ | 0.2 |
| | | | | $2^{nd}$ | — | 72 |
| | $TF_{2AB}$: Wurth 74488540070 | | 1:100 | $1^{st}$ | 7.0μ | 85 m |
| | | | | $2^{nd}$ | 70 m | 205 |

The circuit in FIG. 5 or FIG. 6, may have a single transformer custom designed and made with desired inductance values on the primary and secondary sides as $TF_2$ 402 without having to split it into $TF_{2A}$ 502, 602 and $TF_{2B}$ 504, 604, such that the circuit in FIG. 4 is used in order to save cost and board space.

The prior art step-up DC-DC converter 110 of FIG. 1 has been shown to have an efficiency of 45%, however, while this efficiency could be higher it is curtailed by the diode, $D_1$ 144, forward voltage drop in the rectification scheme. In comparison, a prototype of step-up DC-DC converter 400 indicates that the peak efficiency of the overall system reaches 56% and, in the usable output voltage range (>2.5 V), a gain in efficiency over prior art step-up DC-DC converter 110 (with conventional rectification) can be 10-20 percentage points.

Step-up DC-DC converter 400 is a synchronous rectifier that is self-controlled, or autonomous, without the need of an active controller, which would add complexity to the system and inevitably consume precious overhead power. Instead, there is only one passive component, i.e., transformer $TF_2$ 402 (which may comprise of $TF_{2A}$ 502, 602 and $TF_{2B}$ 504, 604), which acts as a passive controller for the synchronous rectifier, and makes the scheme non-complex and needing little overhead power.

In addition, step-up DC-DC converter 400 is current controlled, that is switches $M_2$ 404 and $M_3$ 406 employed in the synchronous rectifier are controlled solely by the input current to the rectifier, regardless of the input voltage or any other voltage. Consequently, each switch $M_2$ 404 or $M_3$ 406 is turned on if and only if there is a tendency for the relevant diode to conduct; otherwise, the switch $M_2$ 404 or $M_3$ 406 remains off. On the contrary, switches in most other synchronous rectification schemes are controlled by certain signal voltages, which are hardly available in the low-voltage realms such as TEG energy harvesting applications.

Figure 7:
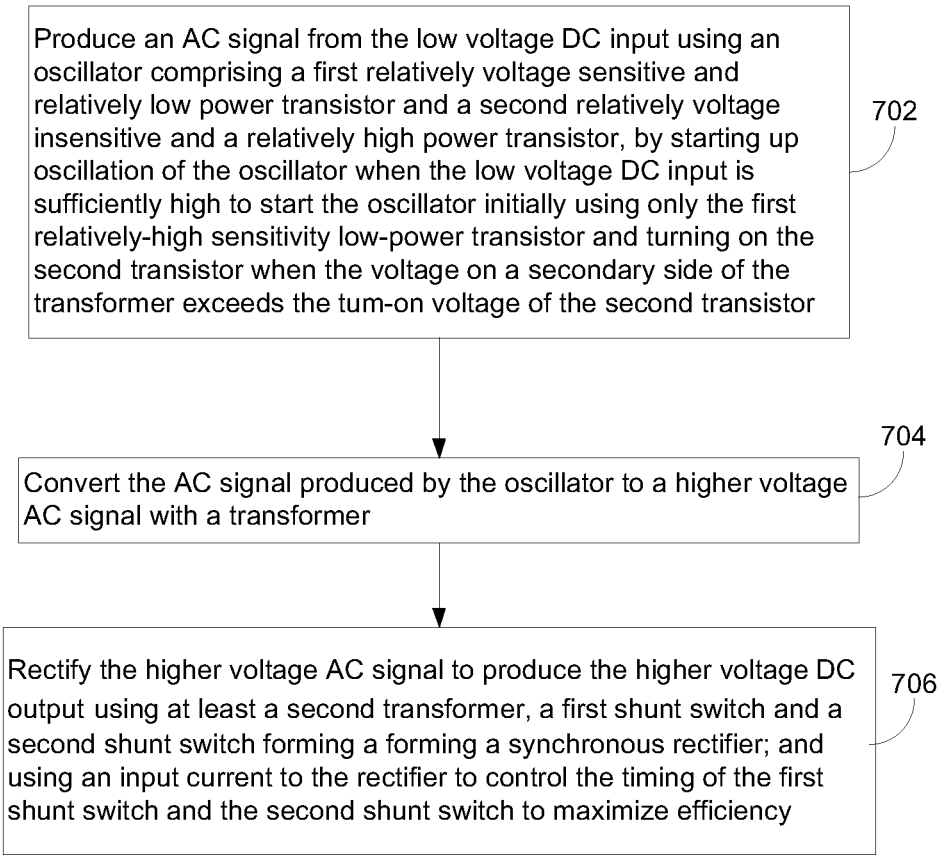
FIG. 7 shows a flowchart outlining exemplary steps for a method of converting a low voltage DC input to a higher voltage DC output, in one exemplary implementation.

Referring now to FIG. 7, shown is a flowchart 700 outlining exemplary steps for a method of converting a low voltage DC input to a higher voltage DC output, in one exemplary implementation. The method begins in block 702 with producing an AC signal from the low voltage DC input using an oscillator comprising a first relatively voltage sensitive and relatively low power transistor and a second relatively voltage insensitive and relatively high power transistor, by starting up oscillation of the oscillator when the low voltage DC input is sufficiently high to start the oscillator initially using only the first relatively high-sensitivity low power transistor, and turning on the second transistor when the voltage on a secondary side of the transformer exceeds the turn-on voltage of the second transistor. The method continues in block 704 with converting the AC signal produced by the oscillator to a higher voltage AC signal with a transformer. The method continues in block 706 with rectifying the higher voltage AC signal to produce the higher voltage DC output using at least a second transformer, a first shunt switch and a second shunt switch forming a rectifier; and using an input current to the rectifier to control the timing of the first shunt switch and the second shunt switch to maximize efficiency and double the voltage.

Figure 8:
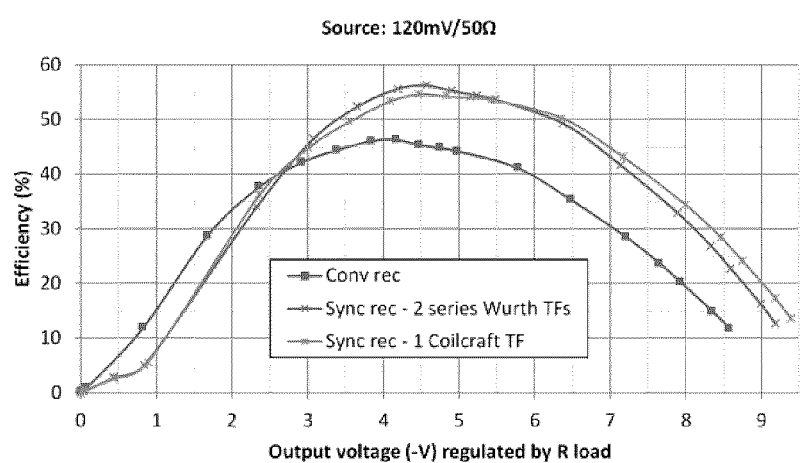
FIG. 8 shows a graph with a comparison of preliminarily measured efficiency values.

Some preliminarily measured efficiency values of prior art step-up DC-DC converter 110 of FIG. 1 and step-up DC-DC converter 400 comprising a synchronous rectification scheme with two variations, as shown in FIG. 4 (Sync rec—1 Coilcraft TF) and as shown in FIG. 5 (Sync rec—2 series Wurth TFs), are shown in FIG. 8, wherein the source's open circuit voltage is 120 mV and its internal impedance is 50 Ω.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments.

The invention claimed is:

1. A DC-DC converter for converting a low voltage DC input to a higher voltage DC output, the DC-DC converter comprising:
   an oscillator comprising a first relatively voltage sensitive and relatively low power transistor and a second relatively voltage insensitive and relatively high power transistor, the oscillator producing an AC signal from the low voltage DC input;
   a first transformer for converting the AC signal produced by the oscillator to a higher voltage AC signal;
   an autonomous, synchronous voltage-doubling rectification circuit for converting the higher voltage AC signal to the higher voltage DC output, the autonomous, synchronous voltage-doubling rectification circuit comprising a second transformer, a first shunt switch and a second shunt switch;
   wherein current through the second transformer controls the autonomous, synchronous voltage-doubling rectification circuit; and
   wherein the second transformer comprises at least two transformers with windings, wherein the at least two transformers are coupled together in at least one of a series configuration and a parallel configuration, wherein at least one of the windings of each of the at least two transformers is coupled to a gate of the first relatively voltage sensitive and relatively low power transistor.

2. The DC-DC converter of claim 1, wherein the first relatively voltage sensitive and relatively low power transistor is a JFET device and the second relatively voltage insensitive and relatively high power transistor is a MOSFET device.

3. The DC-DC converter of claim 1, wherein the second relatively voltage insensitive and relatively high power transistor has a relatively lower on-resistance RDS(on) than the first relatively voltage sensitive and relatively low power transistor.

4. The DC-DC converter of claim 1, further comprising an adaptive clamping mechanism that ensures a suitable bias for the first relatively voltage sensitive and relatively low power transistor under practical source and load conditions.

5. The DC-DC converter of claim 4, wherein the adaptive clamping mechanism comprises a capacitor connected between an output of a secondary side of the first transformers and a gate of the first relatively voltage sensitive and relatively low power transistor, and a gate-source PN junction of the first relatively voltage sensitive and relatively low power transistor.

6. The DC-DC converter of claim 5, wherein the autonomous, synchronous voltage-doubling rectification circuit has a first stage formed of the capacitor of the adaptive clamping mechanism and a gate-source junction of the first relatively voltage sensitive and relatively low power transistor, and a second stage formed of a diode and another capacitor.

7. The DC-DC converter of claim 6, wherein the diode is connected between the capacitor of the adaptive clamping mechanism and the another capacitor, the diode connected to permit current flow in a direction from the another capacitor to the capacitor of the adaptive clamping mechanism.

8. The DC-DC converter of claim 7, wherein the output isolation switch comprises at least one third transistor for isolating a load from a remainder of the DC-DC converter when there are harsh load conditions causing output terminals of the DC-DC converter to be either shorted or driven, and a resistor for allowing a leakage current following removal of the harsh load conditions such that the first relatively voltage sensitive and relatively low power transistor can start up.

9. The DC-DC converter of claim 1, wherein a turns-ratio of at least one of the first transformer and the second transformer is selected for a particular source and load combination.

10. The DC-DC converter of claim 1, wherein the autonomous, synchronous voltage-doubling rectification circuit has a first stage formed of a first capacitor and a gate-source junction of the first relatively voltage sensitive and relatively low power transistor, and a second stage formed of a diode and a second capacitor.

11. The DC-DC converter of claim 1, wherein the first shunt switch and the second shunt switch are MOSFET devices.

12. The DC-DC converter of claim 1, wherein the diode is connected between a first capacitor and a second capacitor, the diode connected to permit current flow in a direction from the second capacitor towards the first capacitor.

13. The DC-DC converter of claim 1, further comprising an output isolation switch.

14. A power supply comprising:
a low voltage source;
the DC-DC converter of claim 1.

15. A method of converting a low voltage DC input to a higher voltage DC output, the method comprising:
producing an AC signal from the low voltage DC input using an oscillator comprising a first relatively voltage sensitive and relatively low power transistor and a second relatively voltage insensitive and relatively high power transistor, by starting up oscillation of the oscillator when the low voltage DC input is sufficiently high to start the oscillator initially using only the first relatively voltage sensitive and relatively low power transistor, and turning on the second relatively voltage insensitive and relatively high power transistor when the voltage on a secondary side of a first transformer exceeds the turn-on voltage of the second relatively voltage insensitive and relatively high power transistor;
converting the AC signal produced by the oscillator to a higher voltage AC signal with the first transformer;
rectifying the higher voltage AC signal to produce the higher voltage DC output using at least a second transformer, a first shunt switch and a second shunt switch forming a rectifier; and using an input current to the rectifier to control the timing of the first shunt switch and the second shunt switch to maximize efficiency, wherein the second transformer comprises at least two transformers with windings, wherein the at least two transformers are coupled together in at least one of a series configuration and a parallel configuration, wherein at least one of the windings of each of the at least two transformers is coupled to a gate of the first relatively voltage sensitive and relatively low power transistor.

16. The method of claim 15, further comprising performing adaptive clamping to ensure a suitable bias for the first transistor under practical source and load conditions.

17. A DC-DC converter for converting a low voltage DC input to a higher voltage DC output, the DC-DC converter comprising: an oscillator comprising a first relatively voltage sensitive and relatively low power transistor and a second relatively voltage insensitive and relatively high-power transistor, the oscillator producing an AC signal from the low voltage DC input; a first transformer for converting the AC signal produced by the oscillator to a higher voltage AC signal; an autonomous, synchronous voltage-doubling rectification circuit for converting the higher voltage AC signal to the higher voltage DC output, wherein the autonomous, synchronous voltage-doubling rectification circuit comprises a second transformer comprising at least two transformers with windings, wherein the at least two transformers are coupled together in at least one of a series configuration and a parallel configuration, wherein at least one of the windings of each of the at least two transformers is coupled to a gate of the first relatively voltage sensitive and relatively low power transistor, a first shunt switch and a second shunt switch; and wherein the first and second transistors of the oscillator are such that the oscillator is initially turned on when the low voltage DC input is sufficiently high to start the oscillator initially using only the first relatively high-sensitivity low power transistor, and the second transistor turns on when the voltage on a secondary side of the transformer exceeds the turn-on voltage of the second transistor.

18. The DC-DC converter of claim 17, further comprising an adaptive clamping mechanism that ensures a suitable bias for the first transistor under practical source and load conditions, and wherein the adaptive clamping mechanism comprises a capacitor connected between the output of a secondary of the transformer and the gate of the first transistor, and a gate-source PN junction of the first transistor.

19. The DC-DC converter of claim 17, wherein the autonomous, synchronous voltage-doubling rectification circuit has a first stage formed of a first capacitor and a gate-source junction of the first transistor, and a second stage formed of a diode and a second capacitor.

* * * * *